United States Patent
Trapasso

(10) Patent No.: US 7,010,414 B2
(45) Date of Patent: Mar. 7, 2006

(54) METHOD FOR REDUCING COMPUTATIONAL TIME FOR CALCULATING A NOISE-FILTERED AVERAGE APPROXIMATION OF THROTTLE POSITION

(75) Inventor: David J. Trapasso, Bloomfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 34 days.

(21) Appl. No.: 10/891,240

(22) Filed: Jul. 14, 2004

(65) Prior Publication Data

US 2006/0015243 A1   Jan. 19, 2006

(51) Int. Cl.
*G01M 15/00* (2006.01)
*G06F 17/10* (2006.01)

(52) U.S. Cl. ............... 701/102; 73/116; 702/151; 708/300; 708/313

(58) Field of Classification Search ............... 123/361, 123/396, 399, 494; 73/116, 117.3, 118.1; 701/102, 103; 702/151; 708/300, 303, 313
See application file for complete search history.

(56) References Cited

U.S. PATENT DOCUMENTS

| | | | | |
|---|---|---|---|---|
| 4,953,089 A | * | 8/1990 | Wolfe | 702/142 |
| 5,477,827 A | * | 12/1995 | Weisman et al. | 123/436 |
| 5,492,102 A | * | 2/1996 | Thomas et al. | 123/493 |
| 5,869,752 A | * | 2/1999 | Klauber et al. | 73/116 |
| 6,081,820 A | * | 6/2000 | Holowko | 708/300 |
| 6,801,923 B1 | * | 10/2004 | Peterson et al. | 708/313 |
| 2005/0160125 A1 | * | 7/2005 | Chatfield et al. | 708/300 |

* cited by examiner

*Primary Examiner*—Tony M. Argenbright
(74) *Attorney, Agent, or Firm*—Jimmy L. Funke

(57) ABSTRACT

A method for reducing computational time for calculating a noise-filtered average approximation of a throttle position in an automotive environment. During controller initialization, an initial average value for N samples is established by conventional averaging. The sum obtained is retained for future use as a previously-retained sum. When an updated average value is required, the oldest sample value and the last output calculation are both subtracted from the previously-retained sum, and the newest sample value is added twice to the previously-retained sum, as well as being stored in sequence in the buffer. The new sum is then divided by the number of sample values to obtain a new noise filtered average approximation of throttle position, which again is retained for use in the next update. The new output value obtained by the throttle position sensor is weighed more heavily to decrease the deviation from the average approximation of throttle position.

18 Claims, 2 Drawing Sheets

METHOD FOR REDUCING COMPUTATIONAL TIME FOR CALCULATING A NOISE-FILTERED AVERAGE APPROXIMATION OF THROTTLE POSITION

TECHNICAL FIELD

The present invention relates to methods for controlling a process; more particularly, to methods for determining a representative value for a process parameter; and most particularly, to a method for reducing the computational time and capacity required for calculating a close approximation of an average value of throttle position for a repeatedly-sampled process output parameter.

BACKGROUND OF THE INVENTION

In controlling a process, it is vital to be able to determine rapidly the value of one or more output control parameters. For instance, in an automotive environment, it is important for the engine control system to monitor the position of the engine throttle since it is a key indicator as to the driver's desired engine power. If the gas pedal is depressed quickly by the driver, the position of the throttle needs to be determined by the engine control system so that the airflow allowed to pass into the engine by the throttle is matched with engine fueling.

Unfortunately, in real-world control situations, such as in controlling the throttle position on an automotive engine, the throttle position output signals being sensed by the engine control system may be quite noisy. If the output signal is too noisy, the control system will react to the noise instead of the true output signal, thereby generating a control error. Therefore, a running average of output values or other types of low pass filters are typically employed to filter out such noise in order to make the signal values useful in controlling throttle position.

The number of calculations in a running average is proportional to the number of values in the running average. Each value to be used must be recovered from memory in a separate computational step, thus potentially requiring a fair amount of computational time. This can become a problem in a control system that must respond quickly to changing conditions. If the computational time exceeds the response time requirement for the system, the process cannot be controlled. This is a known problem when lower cost controllers are used such as in embedded controls, where the computation throughput is usually challenged by the required numerous computations.

The conventional method of performing an average throttle position calculation is to sum all the values and divide by the number of values summed. This requires N+2 computations, where N is the number of values summed. For example, a running average of 30 values requires 32 computations (30 retrievals, 1 summation, and 1 division), plus the software loop time to retrieve each previously saved value, to calculate the average. In an actual implementation, the newest value, Sample(t), obtained from a sensor, is saved in a circular or First In First Out (FIFO) queue, and the oldest value, Sample(t−N), is discarded. This operation is done just prior to performing the averaging calculation.

It is known in the art to shorten the average calculation by a first method as described in U.S. Pat. No. 5,869,752 to Klauber et al. In particular, during controller initialization, an initial average value is established using the conventional averaging method discussed above. The sum obtained is retained for future use. When an updated average is required at a time (t), the oldest value, Sample(1−N), obtained from the circular buffer is subtracted from the previously-retained sum, Sum(t−1), and the newest output value, Sample(t), obtained from the sensor is added to the previously-retained sum, as well as being stored in sequence in the buffer. The new sum, Sum(t) is then divided by the number, N, of values to obtain the latest average output value, Output1, which again is retained for future use in the next update. Thus, each value saved in the queue is not read at each update. The queue is not updated until the averaging calculation is completed because the oldest output value is required.

This method produces a result, Output1(t), equal to the result produced by the conventional averaging method. Mathematically, $$\text{Sum}(t)=\text{Sum}(t-1)-\text{Sample}(t-N)+\text{Sample}(t) \quad\quad (\text{Eq. 1})$$

$$\text{Output1}(t)=\text{Sum}(t)/N \quad\quad (\text{Eq. 2})$$

where Sum(t) is the latest sum, sum(t−1) is the previous sum, Sample(t−N) is the oldest sample value, sample(t) is the newest sample value, and Output1(t) is the running average output value. A disadvantage of this method is that a queue is required and must be maintained for each update.

A second and similar known short-cut method for approximating the running average is disclosed in U.S. Pat. No. 4,953,089 to Wolfe. As in the first method described above, during controller initialization, an initial average output value is established utilizing the conventional averaging method, and the sum is retained for future use. When an updated value, Sum(t), is required, the previous output value, Output2(t−1), is subtracted from the previously retained sum, Sum(t−1), and the newest value, Sample(t), is added to this sum. This sum, Sum(t), is then divided by the number of values, N, to obtain a running "average" value, Output2(t); the sum is also stored for future use. Mathematically, $$\text{Sum}(t)=\text{Sum}(t-1)-\text{Output2}(t-1)+\text{Sample}(t) \quad\quad (\text{Eq. 3})$$

$$\text{Output2}(t)=\text{Sum}(t)/N \quad\quad (\text{Eq. 4})$$

Note that this method provides an Output2(t) that is only an approximation of the true average, Output1(t), and thus is suited for use only as a low pass filter and not for true averaging. The effect of a sample on the output of this method is dependent upon operating conditions and is usually indeterminate, but this method has the advantage of not requiring a queue.

A disadvantage is that the resulting value can have a significant deviation from the true average and also experiences a significant lag between the process output and the calculated value. When a controlled process begins to slide out of control, deviations from the former control average will become increasingly large. In the first method above, those deviations remain in the queue and progressively replace older members of the queue, such that the queue average will slowly follow the change in process output. In both methods, the effect of each new value is felt to 1/N its magnitude, but in the second method, that effect for each new value is felt only once, in calculating Output2, since that Output2 is discarded for the next calculation and we return once more to the original database minus Output2. Since Sample(t−N) is not systematically discarded, there is no mechanism for recognizing that the original database is becoming progressively unrepresentative of the current process output. This is not a problem if the sample deviations are indeed random noise and the process is remaining in control, but this method is slow to detect when the process is sliding out of control.

What is needed in the art is an improved method for reducing computational time for calculating a noise-filtered approximation of a true throttle position average wherein the deviation and phase lag are reduced. The present invention fills these needs as well as other needs.

SUMMARY OF THE INVENTION

Briefly described, the present invention includes an improved method for reducing computational time for calculating a noise-filtered average approximation for controlling throttle position in an automotive system. This method has the advantage of having less phase lag and deviation from the ideal value than the other two prior art methods discussed.

In this method, during controller initialization, an initial average value is established using the conventional averaging method as discussed above. The sum obtained is retained for future use. When an updated average is required, the oldest output value and the last output calculated value are subtracted from the previously-retained sum. The newest value obtained from the sensor is added twice to the sum.

The new sum is divided by the number of values, N, to obtain the latest calculated output value. Therefore, the newest value obtained by the throttle position sensor is weighed more heavily to decrease the deviation from, and more truly represent, the newest value obtained from the sensor. This increases the stability and performance of the system. Furthermore, the method of the present invention also stores the newest value obtained from the throttle position sensor in sequence in the buffer so that subsequent output values may be calculated.

BRIEF DESCRIPTION OF THE DRAWINGS

The present invention will now be described, by way of example, with reference to the accompanying drawings, in which.

DESCRIPTION OF THE PREFERRED EMBODIMENTS

The present invention includes a rapid method for approximating the running average of a plurality of successive sample values, for example, successive output values from a process being controlled, wherein significant mathematical noise requiring filtering is present in the plurality of values. The newest sample output value obtained during the process is weighed more heavily in approximating the running average to decrease the deviation from, and more truly represent, the newest sample output value.

Figure 1:
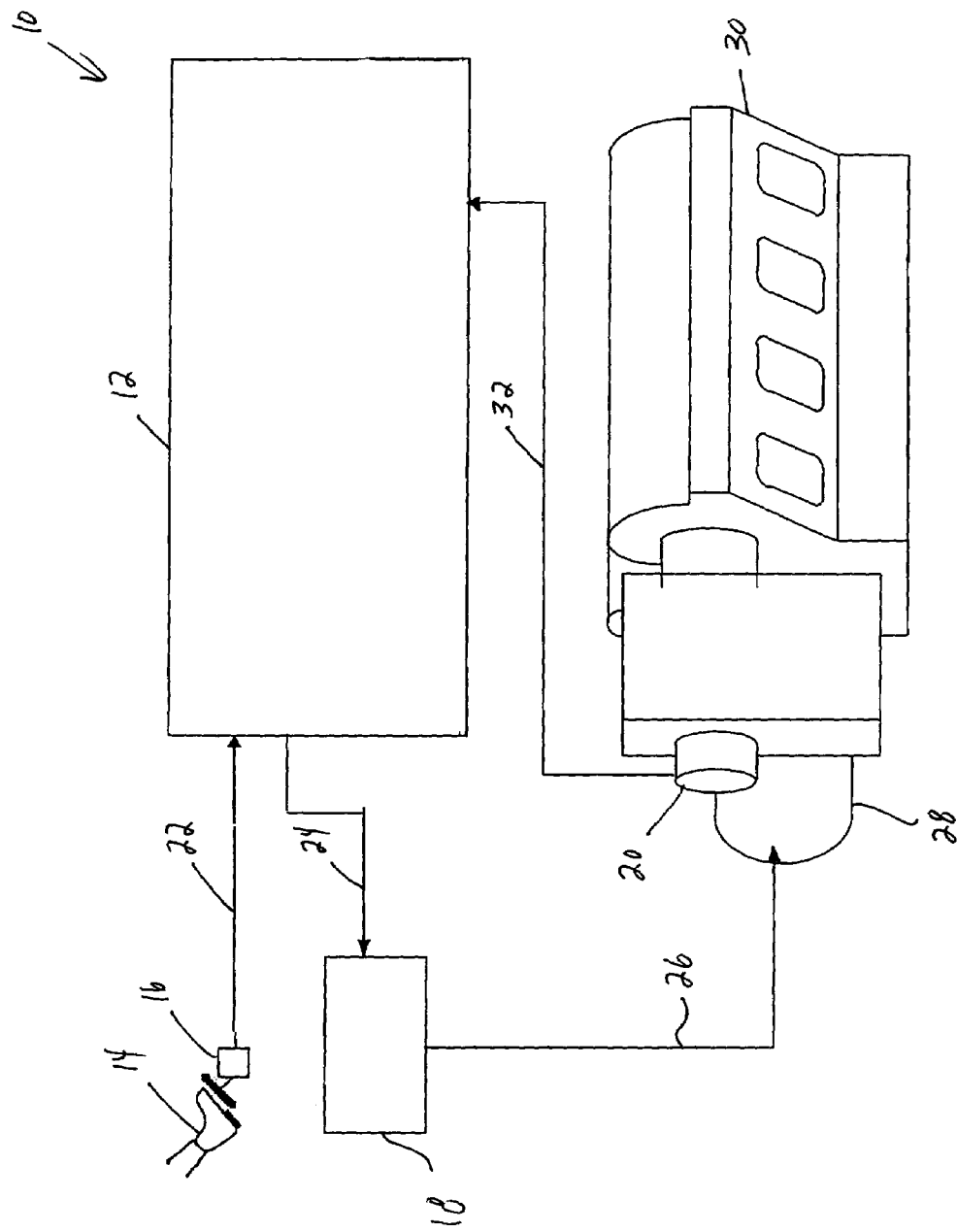
FIG. 1 is a schematic view of a system that may be used to calculate a noise-filtered average approximation of the throttle position in a vehicle in accordance with the present invention.

Referring to the drawings and particularly FIG. 1, there is shown an automotive system 10 that may be used to obtain a approximate value of a running average throttle position value from a plurality of sample throttle position values taken at a plurality of time intervals during operation of an engine. In general, automotive system 10 includes an electronic computer module (ECM) or computer 12 that is adapted to receive an indication of a driver's 14 desired engine power, position the engine throttle (not shown) in accordance with the desired engine power, and receive successive sample throttle position values representing the actual position of the throttle. In addition to receiving successive sample throttle position values, ECM 12 also receives mathematical noise. ECM 12 filters the noise in accordance with the present invention to approximate the running average of a plurality of successive sample throttle position values, which will be discussed in more detail below.

ECM 12 may include a computing environment or processor operable to perform tasks or instructions in accordance with pre-programmed algorithms, execution instructions or sequences, computations, software code modules, interface specifications or the like. It will be understood and appreciated that the functions performed by ECM 12 may be implemented in a computing environment such as a personal computer (PC) or other computing device. Such computer may also include a storage device including volatile and nonvolatile, removable and non-removable media implemented in any method or technology for storing information such as program modules, data structures, computer readable instructions, or other data.

The computer storage media may include, but is not limited to, floppy disks, conventional hard disks, Read Only Memory (ROM), Random Access Memory (RAM), flash memory, Electrically Erasable Programmable Read-Only Memory (EEPROM), or other types of memory, magnetic cassettes, magnetic tape, magnetic disk storage or other magnetic storage devices, CD-ROM, digital versatile disks (DVD) or other optical disk storage, or any other medium which can be used to store the desired information and which can be accessed by the computer.

ECM 12 may also include communication media for sending and receiving signals, instructions or other parameters from other components in the automotive system, such as a pedal device 16, a motor drive circuit 18 and a throttle position sensor 20. Communication media typically embodies computer readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a direct wired connection, and wireless media such as acoustic, RF, infrared and other wireless media. It will be understood that combinations of any of the above should also be included within the scope of computer readable media.

As best seen in FIG. 1, ECM 12 is connected to pedal device 16 for receiving a throttle position command signal 22 indicative of driver's 14 desired engine power. ECM 12 is also connected to motor drive circuit 18. ECM 12 may send a motor command signal 24 indicating the desired position of the throttle valve. The motor command signal is obtained by the following relationship.

$$\text{Motor Command Signal} = (\text{Throttle Position Command} - \text{Output3}(t)) * \text{Gain} \qquad \text{(Eq. 5)}$$

The updated filter average is represented by Output3(t), the calculation of which will be discussed in more detail below in accordance with the present invention. The Gain is a value representing the increase in signal power for the Motor Command Signal.

Once motor drive circuit 18 receives the motor command signal 24, the motor drive circuit sends a motor drive signal 26 to a throttle actuator 28 that operates to position the throttle within an engine 30. A throttle position sensor 20 is associated with the throttle and is used to measure, sense or otherwise determine the actual position of the throttle. The throttle position sensor 20 then sends a throttle position signal 32 to ECM 12. However, in sending the throttle position signal 32, noise will also be received by ECM 12. EMC then implements the method of the present invention to filter the noise by approximating the running average of a plurality of successive sample throttle position values sent by throttle position sensor 20.

Figure 2:
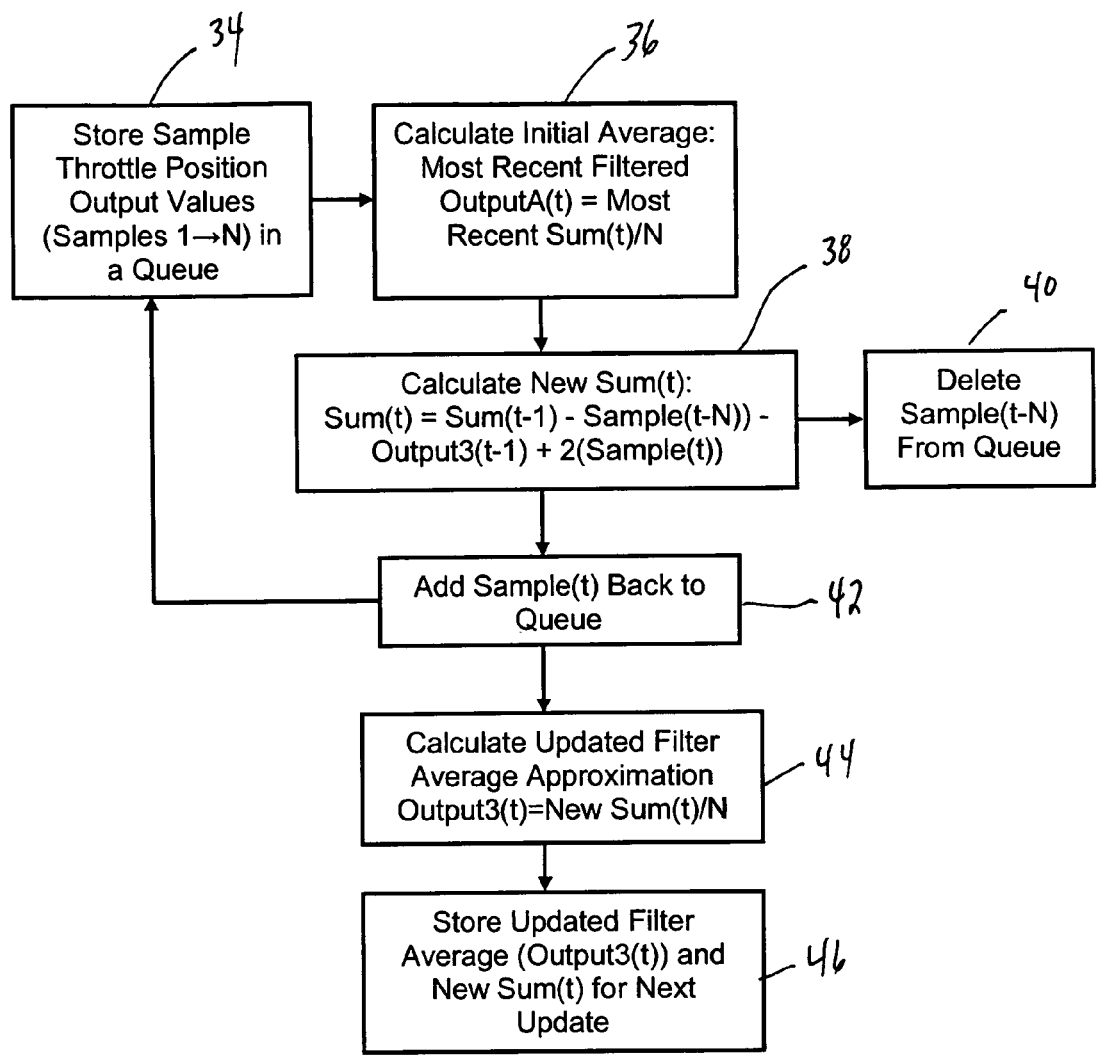
FIG. 2 is a flow chart showing the method of calculating the noise filtered average approximation in accordance with the present invention.

In the method of the present invention, during controller initialization, an initial true average value is established to characterize the process output, using the conventional mathematical averaging method. As best seen in FIG. 2, step 34 shows that a predetermined number, N, of output values, Sample (1→N), are accumulated sequentially in a queue in a circular buffer located in storage in ECM 12 over a predetermined period of time and is summed at the present time (t), Sum(t). The sum obtained is retained in ECM 12 storage for future use. In step 36, the process output average, OutputA(t), is obtained in known fashion by dividing the current sum by the number of samples. Mathematically, $$\text{OutputA}(t) = \text{Sum}(t)/N \quad \text{(Eq. 6)}$$

As seen in step 38, when an updated filtered throttle position average, Output3(t), is required, the previously-retained sum, Sum(t−1), is retrieved. The oldest output value, Sample(t−N), obtained from the queue in the circular buffer is subtracted from Sum(t−1) and then is discarded in step 40.

To obtain the new Sum(t), the last output calculation, Output3(t−1), is also subtracted from the previously-retained sum, Sum(t−1), and the newest value obtained from the sensor, Sample(t), is added twice to the sum. This is an improvement on Method 2, as the most recent information is given double its weight in the new calculation, reducing both lag and deviation from the true average in the calculation.

In step 42 the newest sample, Sample(t), is added to the queue in the circular buffer, restoring the number of saved samples to N for calculating updated filtered averages (i.e., Output4(t), Output5(t), etc.). This is an improvement upon Method 2 described above, as it provides a means for progressive replacement of older members of the queue by newer samples.

In step 44, the new sum, Sum(t), is then divided by the restored number of throttle position samples in the queue, N, to obtain the latest calculated output value, Output3(t), which again is retained for future use in the next update in step 46.

Thus, each sample throttle position value saved in the queue is not read at each update, greatly shortening the calculation time over simple averaging. Also, in practice the queue is not updated until the calculation is completed because the oldest output value is required for the calculation.

Mathematically, $$\text{Sum}(t) = \text{Sum}(t-1) - \text{Sample}(t-N) - \text{Output3}(t-1) + 2 \times \text{Sample}(t) \quad \text{(Eq. 7)}$$

$$\text{Output3}(t) = \text{Sum}(t)/N \quad \text{(Eq. 8)}$$

After obtaining the approximate throttle position average value, Output3(t), it is then used in Equation 5 (Eq. 5) set forth above to establish a new or current motor command signal. If the driver's engine demand is greater than the current approximate throttle position average, Output3(t), then ECM 12 will send a motor command signal 24 instructing that the throttle be further opened. In contrast, If the driver's engine demand is less than the current approximate throttle position average, Output3(t), then ECM 12 will send a motor command signal 24 instructing that the throttle be further closed to reduce the output of the engine.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for calculating an approximate value of a running average throttle position value from a plurality of sample throttle position values taken at a plurality of time intervals during operation of an engine, wherein said plurality of sample throttle position values includes an oldest sample throttle position value, the method comprising:
    calculating a value of said throttle position by summing a predetermined number of said sample throttle position values taken over a predetermined period of time to provide a first sum, and dividing said first sum by said predetermined number to provide a first filtered output value;
    obtaining a new sample throttle position value at a time interval after said predetermined period of time;
    calculating a second sum from said first sum by:
        subtracting the oldest sample throttle position value,
        subtracting said first filtered output value, and
            adding twice the value of said new sample throttle position value;
    calculating a second filtered output value by dividing said second sum by said predetermined number of said sample throttle position values, wherein said second sum represents the approximate value of the running average throttle position value.

2. A method in accordance with claim 1 wherein said predetermined number of said sample throttle position values are stored in a queue.

3. A method in accordance with claim 2 further comprising:
    arranging said queue of said sample throttle position values in chronological order.

4. A method in accordance with claim 2 further comprising:
    deleting the oldest sample throttle position value from said queue; and
    adding said new sample throttle position value to said queue.

5. A method in accordance with claim 1, further comprising:
    storing for retrieval said second sum and said second filtered output value.

6. A method for calculating an approximate value of a running average value of a process output from a plurality of sample values taken at a plurality of time intervals during operation of the process, comprising:
    a) calculating a value of said process output by summing a predetermined number of said sample values taken over a predetermined period of time to provide a current sum, and dividing said current sum by said predetermined number to provide a current filtered output value, said predetermined number of sample values defining a queue of said sample values;
b) storing said queue of sample values in chronological order;
c) storing said current sum as a most-recent sum for retrieval;
d) storing said current filtered output value as a most-recent filtered output value for retrieval;
e) taking a new sample value at a time interval after said predetermined period of time;
f) retrieving said stored most-recent sum;
g) retrieving said stored most-recent filtered output value;
h) calculating a new current sum from said most-recent sum by:
  subtracting the oldest value of said sample values, subtracting said most-recent filtered output value, and adding twice the value of said new sample value;
i) calculating a new filtered output value, defining said approximate value of a running average value, by dividing said new current sum by said predetermined number of sample values in said queue.

7. A method in accordance with claim 6 further comprising:
a) adding said new sample value to said queue;
b) storing for retrieval said new current sum as a new most-recent sum replacing the previous most-recent sum; and
c) storing for retrieval said new filtered output value as a new most-recent filtered output value replacing the previous most-recent filtered output value.

8. A method in accordance with claim 7 wherein steps e) through i) in claim 6 and steps a) through c) in claim 7 are repeated a plurality of times.

9. A system for obtaining an approximate value of a running average throttle position value from a plurality of sample throttle position values taken at a plurality of time intervals during operation of an engine, wherein said plurality of sample throttle position values includes an oldest sample throttle position value, the system comprising:
  a storage device operative to store said sample throttle position values taken over a predetermined period of time; and
  a processor programmed to:
    calculate a value of said throttle position by summing a predetermined number of said sample throttle position values stored in said storage device to provide a first sum, and dividing said first sum by said predetermined number to provide a first filtered output value;
    obtain a new sample throttle position value at a time interval after said predetermined period of time;
    calculate a second sum from said first sum by:
      subtracting the oldest sample throttle position value,
      subtracting said first filtered output value, and
      adding twice the value of said new sample throttle position value;
    calculate a second filtered output value by dividing said second sum by said predetermined number of said sample throttle position values,
    wherein said second sum represents the approximate value of the running average throttle position value.

10. The system in accordance with claim 9 wherein said storage device places said predetermined number of said sample throttle position values in a queue.

11. The system in accordance with claim 10 wherein said queue of said sample throttle position values are in chronological order.

12. The system in accordance with claim 10 wherein said processor is programmed to:
  delete the oldest sample throttle position value from said queue; and
  add said new sample throttle position value to said queue.

13. The in accordance with claim 9 wherein said second sum and said second filtered output value are retrievably stored in said storage device.

14. A computer-readable medium having computer-executable instructions for performing a method for calculating an approximate value of a running average throttle position value from a plurality of sample throttle position values taken at a plurality of time intervals during operation of an engine, wherein said plurality of sample throttle position values includes an oldest sample throttle position value, the method comprising:
  calculating a value of said throttle position by summing a predetermined number of said sample throttle position values taken over a predetermined period of time to provide a first sum, and dividing said first sum by said predetermined number to provide a first filtered output value;
  obtaining a new sample throttle position value at a time interval after said predetermined period of time;
  calculating a second sum from said first sum by:
    subtracting the oldest sample throttle position value,
    subtracting said first filtered output value, and adding twice the value of said new sample throttle position value;
  calculating a second filtered output value by dividing said second sum by said predetermined number of said sample throttle position values, wherein said second sum represents the approximate value of the running average throttle position value.

15. A method in accordance with claim 14 wherein said predetermined number of said sample throttle position values are stored in a queue.

16. A method in accordance with claim 15 further comprising:
  arranging said queue of said sample throttle position values in chronological order.

17. A method in accordance with claim 15 further comprising:
  deleting the oldest sample throttle position value from said queue; and
  adding said new sample throttle position value to said queue.

18. A method in accordance with claim 14, further comprising:
  storing for retrieval said second sum and said second filtered output value.

* * * * *